Figure 1:
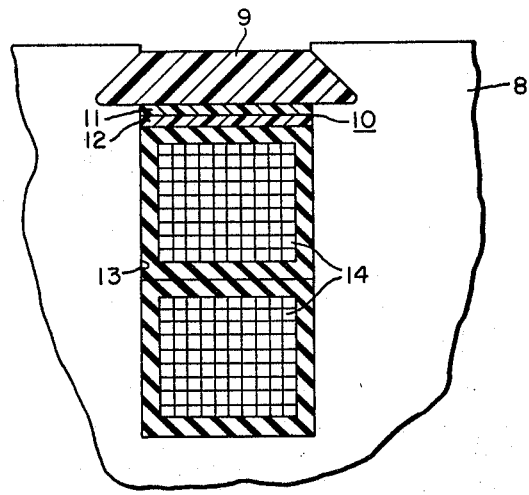

INVENTOR
Joseph E. Moxie and
John R. Shirley 3,391,294
ARMATURE CORE SLOT FILLER WITH
DUAL CHARACTERISTICS
Joseph E. Moxie, Penn Hills, Pittsburgh, and John R. Shirley, Saltsburg, Pa., assignors to Westinghouse Electric Corporation, Pittsburgh, Pa., a corporation of Pennsylvania
Filed Jan. 3, 1966, Ser. No. 518,471
5 Claims. (Cl. 310—214)

The present invention relates to a unique means for efficiently wedging core slot structures in dynamoelectric machines.

As is well known to those working in the dynamoelectric machine art, stator and rotating armature windings are supported in slotted iron core structnre generally formed from laminated sections secured together to provide unitary magnetic structures. It is particularly important in the rotating armature (rotor) art that the windings be properly secured in the core slots because of the extremely high centrifugal forces developed in high speed machine rotors.

Generally, in both stator and rotor core structures, insulating wedges are inserted in grooves provided in the slot wall and extending the length thereof near the open end of the slot. The wedges extend over the length of the windings stacked within the slot and thus close the open end.

The wedging of rotors has generally been a time-consuming and difficnlt process. The prime function of the wedge is to hold the coil or winding stacks tightly in place in the slot so that no play and resulting movement can occur when the armature rotates. Thus the wedges must provide a tight fit against the coil within each core slot. This is difficult to accomplish with only a wedge since the coils vary in size due to varying tolerances in copper and insulation materials as well as the human element involved in winding and insulating core coils; and to drive a wedge through a slot containing a heavy coil sitting high in the slot can damage the coil insulation.

To overcome the wedging problems outlined above, the coils are designed to be undersized to allow a filler strip to be placed between the coils and the wedge. The filler strip provides a smooth surface upon which the wedge can slide as it is driven into the core slot. With this means and method, however, further problems are encountered. As mentioned earlier, winding stacks are not uniform in size, and filler materials must have hard smooth surfaces to facilitate sliding of the wedge. Therefore, it is the workman assembling the armature chooses a filler strip that is substantially equal to or greater than the proper thickness to fill the space between the coil and wedge, the filler strip slides with the driven wedge and may break, fold over or pile up in the slot at the leading edge of the wedge. The filler strip must be breakable so that those portions which extend beyond the wedge can be easily broken off. In addition, the workman attempts to anticipate a certain amount of slide so that the filler is normally placed in the slot with its end extending beyond or in front of the final position of the wedge. If the filler strip does not slide with the wedge it will protrude beyond the trailing end of the wedge and hence must be broken off at that point. The end result requires either removal of the wedge and filler with further wedging endeavors or large variations in the amount of filler per slot at a given location along the length of the coil. The second alternative leaves portions of coil tightly secured while other portions thereof remain loose within the slot with all the attending hazards created thereby. Thus, with presently used filler means, the costly, time-consuming, difficult process of wedging core slots remains.

With these problems in mind, there is provided in accordance with the general principles of the present disclosure a unique filler means that greatly simplifies the operation of core slot wedging. The new filler means is essentially an insulating laminated sheet comprising two distinct layers of materials bonded together. The first layer is formed to have at least one hard smooth surface and can be made from such materials as phenolic impregnated asbestos laminates or similar resin impregnated materials. The second material forming the laminated sheet is a compressible, absorbent substance such as a soft, unimpregnated asbestos or glass asbestos fiber mat which form a rough and uneven type of surface. The two layers are bonded together with a suitable adhesive or varnish such as an air-drying epoxy resin type. The single, new filler of the proper length is then placed over the coil in the slot with the soft, compressible side disposed against the rotor or stator windings. The hard, smooth side is left facing the wedge so that when the wedge is driven into the slot it slides easily along the smooth surface. The filler does not slip or move with the driven wedge since the soft and uneven underside of the filler grips the surface of the windings. Thus the filler strip does not crack or break and pile up. No adding or substituting of fillers is required, and no breaking away of filler strip ends is necessary. And since the soft, uneven side of the strip is compressible, it fills any voids that may exist between the wedge and the winding, and provides a sponge-like volume which accepts and holds core treating resins. This further eliminates voids between the wedge and coil and gives increased core heat dissipation qualities since the current carrying windings are now firmly held against the body of the iron core and the treated filler strip provides a solid, continuous mass reaching to and through the wedge to the periphery of the core.

Accordingly, it is the object of the present invention to provide a simple and inexpensive yet highly efficient and effective filler means that eliminates the problems involved in wedging core slots in dynamoelectric machines.

A more specific object of the invention is to provide a laminated filler strip that will fill a core slot between a wedge and winding over its entire length.

Yet another object of the invention is to provide a filler strip for a core slot that requires only one strip per slot and will not slide with the driving of a wedge in the slot.

Still another object of the invention is to provide a filler strip that gives increased heat transfer qualities and insures a snug fit for coils disposed in a core slot along the entire length thereof after the slot is wedged.

Figure 2:
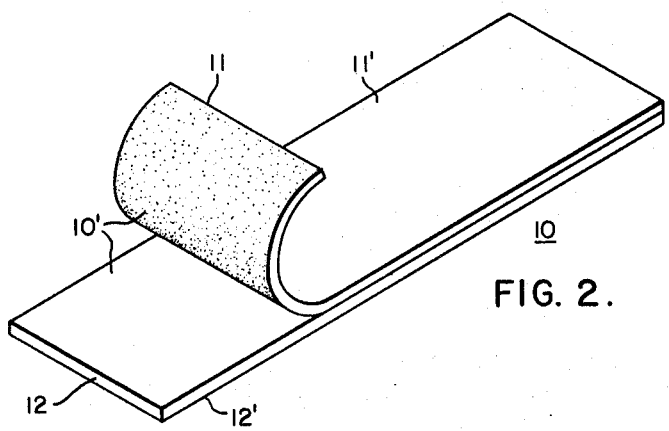

These and other objects and advantages of the invention will become more apparent from the following detailed description taken in conjunction with the accompanying drawing in which:

FIGURE 1 is a partial elevational view of a typical core slot containing two coils and, in cross section, a wedge and the novel slot filler constructed in accordance with the principles of the present invention; and FIG. 2 is an enlarged perspective view of the novel slot filler shown in FIG. 1.

Specifically, in FIG. 1, there is shown a partial elevational view of a typical rotating armature core 8 depicting only one longitudinal core slot 13 in the periphery thereof for purposes of illustration. In slot 13 are disposed two insulated coils 14, only representatively shown, which extend longitudinally of armature or rotor core 8. Two coils 14 are shown only for purposes of illustration, the number and types of rotor coils depending upon the size of the machine as well as other design considerations. Immediately above the uppermost coil 14, and in contact therewith, is the unique slot filler means 10 to be fully described hereinafter. Above the filler means is disposed a typical slot wedge 9 (in cross section) designed to close the slot opening and secure windings 14 within slot 13 in such a manner that no movement of the windings takes place when armature 8 rotates.

As mentioned earlier, it is supremely important that no movement of core windings 14 be allowed within the slot 13. The high rotational speeds of rotor 8 make it imperative that windings 14 be tightly held in place by wedge 9. However, as explained earlier, it is difficult to wedge such slots because of the uneven surfaces presented by the core windings. The present disclosure is directed to overcoming these problems as explained hereinafter.

The unique filler strip 10 herein consists (primarily) of an elongated heat resistant and insulating strip of material having one hard and smooth surface 11' and one soft, uneven surface 12' made of a compressible material 12 as best seen in FIG. 2. Filler strip 10 is placed in slot 13 over upper coil 14 with the soft, compressible side facing down and against the coil or winding. The hard surface 11', then, faces up and against wedge 9 after it is driven into the slot.

Filler strip 10 is so designed that the thickness thereof will insure a universally snug fit between wedge 9 and coils 14 along the entire length of the coils. This is accomplished by the soft, compressible side 12. The uneven surfaces presented by the top side of upper coil 14 are accommodated by compressible material 12. Thus, the varying space dimensions between coils 14 and wedge 9 and the recessed areas in the top side of upper coil 14 are filled in with compressible material 12, and raised portions and projections on the coil surface are accommodated by material 12. In such a manner no part of the coil structure within the slot is allowed to remain loose or free for movement within the armature core slot.

It is further to be noted that because of the accommodating characteristics of material 12, uneven surface 12' adheres to the coil surface so that filler strip 10 will not slide along the coil surface when wedge 9 is driven into slot 13, remembering also that upper surface 11' is hard and smooth so that wedge 9 easily moves therealong when driven into slot 13.

It should also be noted that with the unique filler strip herein disclosed, only a single strip is needed per slot. The workman does not have to concern himself with the total thickness of the particular filler or fillers per slot. A single filler strip 10 having the compressible and accommodating features described above eliminate such decisions on the part of those assembling the machine. Further savings in material are involved since strip 10 will not slide through the slot to extend beyond the armature core end to be broken off.

In FIG. 2 is shown a preferred embodiment of the novel filler strip herein disclosed. Filler strip 10 is shown in both figures as a laminated structure generally comprising two layers 11 and 12 of material though the invention is not limited thereto. The thickness of filler strip 10 (layers 11 and 12) is shown greatly enlarged in order to show clearly the nature and structure of the present invention. Upper layer 11, as previously described, has a hard, smooth surface 11' upon which wedge 9 can easily slide as it is driven into core slot 13 from either end thereof. Therefore layer 11 must be made of a material that will provide such a surface as well as be a heat resistant, insulating material. And as mentioned above, phenolic impregnated asbestos laminates provide all such characteristics including the necessary hard and smooth surface 11', though the invention is not limited thereto. The bottom layer 12 of material, in contrast to layer 11, is made of a soft, absorbent material such as an unimpregnated asbestos or glass asbestos fiber mat which is also heat resistant and an insulating material.

The two layers of materials 11 and 12 in sheet form are bonded together to form unitary slot filler strip 10 by use of a suitable adhesive or varnish (not shown) such as an air-drying epoxy resin. The adhesive is lightly spread over the inside surface 10' (FIG. 2) of layer 11, and the layers are then placed together and allowed to dry. After the adhesive has dried, layers 11 and 12 form a single unitary filler sheet. The sheet can then be cut into strips of filler 10, and the strips can then be placed within a machine core slot for use as described above. As described above and as shown in the drawing, a rotor structure is employed to show the utility of applicants' unique slot filler 10. However, the slot filler disclosed herein would have substantially the same utility in a stator core slot though wedging is more critical in the rotor.

It has been noted that bottom layer 12 of slot filler 10 has the additional characteristic of being absorbent. Thus, the material of layer 12 provides an absorbent volume that will accept and hold treating resins that are applied to and cured in the finished armature. With the completion of the treating and curing process, absorbent layer 12 completes its function of filling in the voids and spaces that may exist between the wedge and the coil. Layer 12 thus provides a solid mass of material in firm contact with the current carrying coil structure, and with hard layer 11 and wedge 9 provides a substantially continuous solid mass of material between the coil structure and the periphery of the rotor. With such a mass, the heat developed within the core and the coils is easily transferred therethrough to the air gap between the rotor and stator where it is effectively dissipated. Therefore, the unique slot filler 10 serves further to insure efficient heat dissipation within the machine.

It should now be apparent that the present disclosure defines a very effective and efficient slot filler means for dynamoelectric machines. The unique slot filler described herein has the two general characteristics (hardness and softness) that make it a unique device for overcoming very real problems in wedging core slots containing core windings. By securing itself against the coil surface by virtue of soft layer 12, yet facilitating movement of driven wedge 9 over its hard surface 11', a very efficient wedging process is brought about sliding and breaking of the filler strip is substantially eliminated with the results of savings in time and material while simultaneously insuring a tight fit of the coils within and throughout the length of the slot since soft layer 12 fills in the varying spaces that can exist therealong between the wedge and coil.

What is claimed is:

1. In a dynamoelectric machine having core slots containing core windings and a wedge means disposed over the windings, a filler means disposed between the windings and wedges and extending substantially the length thereof, said filler means having one hard and smooth surface adjacent the wedge means, and a soft, compressible surface adjacent the winding.

2. The machine of claim 1 in which the soft surface of the filler strip is absorbent so as to reecive and hold treating resins.

3. The machine of claim 1 in which the filler means is a laminated structure comprising one hard and smooth layer of material and one soft, compressible layer of material bonded together.

4. The machine of claim 3 in which the laminated structure comprises one layer of resin impregnated material and one layer of soft, compressible unimpregnated material.

5. The machine of claim 1 in which the hard surface is made of a hard, insulating and heat resistant material and the soft surface is made of a soft, insulating and heat resistant material.

References Cited

UNITED STATES PATENTS

| | | | |
|---|---|---|---|
| 1,238,304 | 8/1917 | Kuyser | 310—214 |
| 2,173,726 | 9/1939 | Prindle | 310—215 |
| 2,201,699 | 5/1940 | Myers | 310—214 |
| 3,093,764 | 6/1963 | King et al. | 310—214 |

FOREIGN PATENTS 267,644   1/1926   Great Britain.

MILTON O. HIRSHFIELD, *Primary Examiner.*

L. L. SMITH, *Assistant Examiner.*